Nov. 21, 1939.     R. H. GEORGE     2,180,734
SCREEN MATERIAL
Filed Sept. 30, 1935
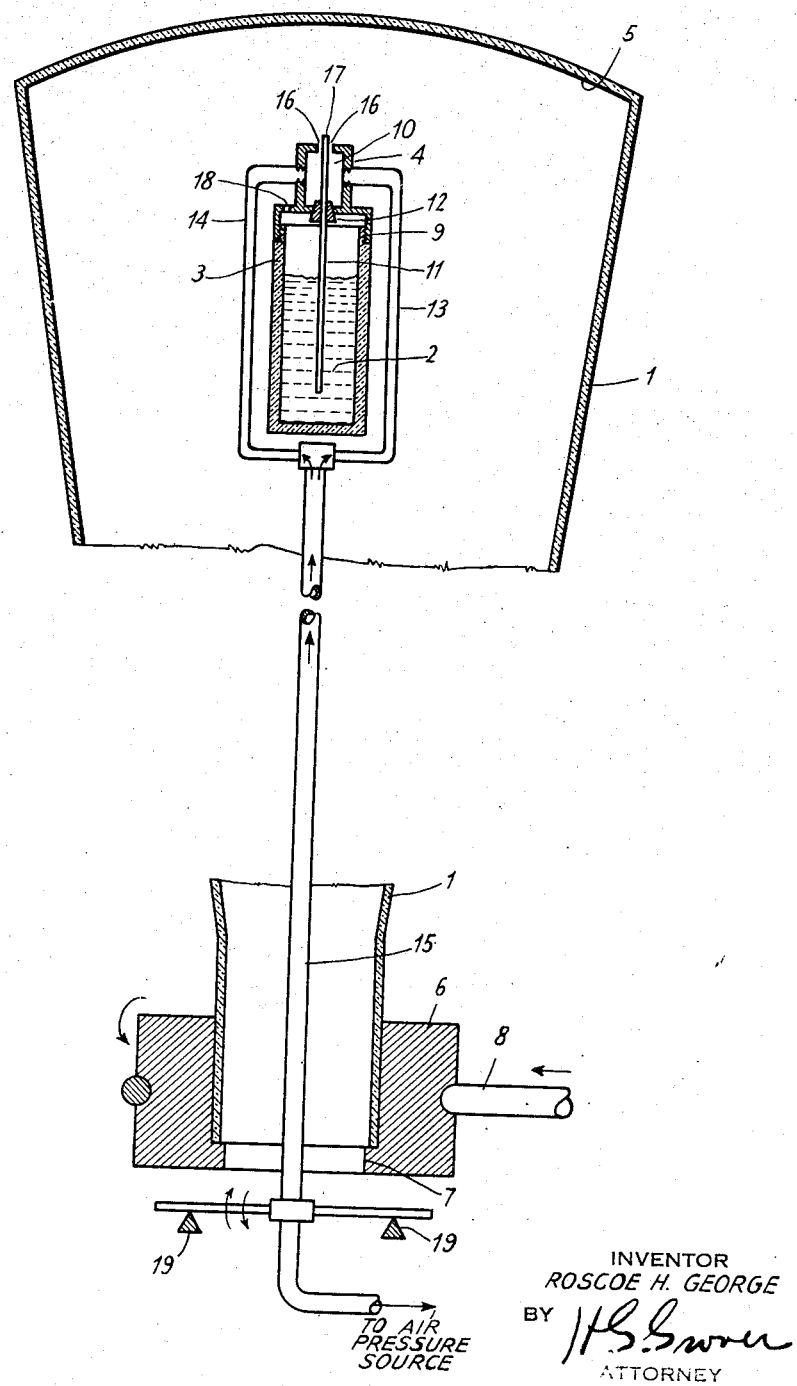
INVENTOR
ROSCOE H. GEORGE
BY
ATTORNEY Patented Nov. 21, 1939

2,180,734

UNITED STATES PATENT OFFICE 2,180,734

SCREEN MATERIAL

Roscoe H. George, West Lafayette, Ind., assignor to Radio Corporation of America, a corporation of Delaware Application September 30, 1935, Serial No. 42,816

15 Claims. (Cl. 250—27.5)

The present invention relates to the preparation and production of materials which are particularly suited for use in the method of preparing fluorescent screens and the inner end surfaces of a cathode ray tube, for example, so that fluorescent or luminescent effects are developed with the tube under the action of an electronic beam or ray.

Electronic tubes of this type find particular application in television systems as well as in connection with oscilloscopic observations and measurements and for X-ray uses.

In preparing any material which is to be used for coating the inner surface of the end wall of an electronic or cathode ray tube, for example, it is desirable not to overlook the fact that the most pleasing fluorescent effects usually result when the activating electron beam or ray causes the material to fluoresce or luminesce in substantially black and white colors.

Furthermore, it is an object of this invention to provide material adapted to produce fluorescent or luminescent effects within a cathode ray tube which has the characteristic properties of being susceptible to easy manipulation and application upon the inner end wall of the cathode ray tube.

It is a further object of the invention to provide material of the character described which shall have sufficient brilliance when activated by an impinging electron beam but which shall, nevertheless, decay in brilliance at a rapid rate, for example, 1/30th of a second, from extreme brightness, that is, "white", to extreme darkness, that is, "black".

It is a further object of this invention to provide material of the character described which shall have a substantially invariant spectrol distribution and which shall resist "burning" by high speed electrons impinging thereupon.

A still further object of this invention is to provide material for coating the inner surfaces of electronic or cathode ray tubes which shall become luminescent or fluorescent at relatively low electron beam control voltages but which shall have high secondary emission efficiency.

Still other and further objects of the invention will become apparent from the description which is to follow, of which the drawing forms a part, and by which the single figure of the drawing illustrates diagrammatically one method by which the prepared material may be deposited upon the surface of the inner end wall of the cathode ray tube prior to the complete assemblage of the tube.

A preferred method of preparing a screen material which will have the qualities above defined as desirable is to provide a mixture somewhat as follows:

| | Parts by weight |
|---|---|
| Tungstic acid, $WO_3$, C. P. | 43 |
| Basic magnesium carbonate, $3MgCO_3.Mg(OH)_2.3H_2O$, C. P. | 16 |
| Lithium nitrite, $LiNO_2.H_2O$, C. P., or sodium nitrite, $NaNO_2$, C. P. | 2 |

In preparing screen material from such a mixture, the tungstic acid and magnesium carbonate are mixed thoroughly while dry and are then formed into a thin paste with the lithium or sodium nitrite which has been dissolved in a quantity of distilled water. In this mixture the water is added to facilitate mixing of the ingredients, and to promote the reaction between the tungstic acid and the magnesium carbonate. After the material is thoroughly mixed, the resulting paste is heated in air until the water and carbon dioxide are both driven off. At this point, if desired, the material may be further powdered in a mortar. The material is further heated, preferably to a temperature of the order of 900 to 1000 degrees centigrade in the presence of air, for a period of time of the order of twenty to forty minutes until the nitric oxide fumes cease to evolve. After cooling, the material is then pulverized and washed in at least three changes of distilled water to remove the soluble lithium or sodium compounds, after which it is dried and again heated to 900 to 1000 degrees centigrade in the presence of air for twenty to forty minutes. After cooling, the material is then, preferably, again pulverized. So prepared, the material may then be stored in suitable containers prior to its use and application to the tube for a coating.

There results, therefore, a magnesium tungstate in which the reduced lithium or sodium is held in physical bondage to the tungstate as an activator. The term "activated" is here used in accordance with the meaning in the art of luminescent materials, and indicates that a substance is held entrained in the fluorescent material, the quantity of the material being small and serving to improve the luminescent properties of the material.

In order to apply this material to the tube 1, as shown in the drawing, it is preferable to mix amyl acetate or any other binder that may be burned without leaving any residue with the mixture above described. This entire mixture 2 may be then placed within a container 3 and sprayed by means of a gun 4 so as to coat the inner end wall 5 of the tube 1. Prior to spraying the mixture it is, of course, essential that the glass forming the tube wall be thoroughly cleaned and dried.

The drawing shows one means for spraying the screen material although other means could be used or the screen material could, when desired, be deposited by known settling processes.

To spray the screen the unfinished and unevacuated tube 1 is suggested in the work holder 6 which has a central internal opening 7 through which the spray gun 4 is passed. A suitable means, such as the belt drive 8, is arranged to rotate the work holder and thus the tube 1 while the screen spraying process is being carried forward.

As above stated the liquid material 2 to be sprayed is held in the container 3 and this is screwed into the gun 4 and held by suitable threads 9. Over the end of the container 3 and closing the bottom of an air chamber 10, there is fitted a tubular member 11 which has a shoulder 12, preferably screwed into the air chamber 10, tightly closing the top of the container. The tube 11 extends through the shoulder 12 and into the container 3 as shown. Air under pressure from any appropriate source (not shown) is supplied through the tubes 13 and 14 to the air chamber 10. The high pressure air source (not shown) connects with the air supply tube 15 and when the air enters the chamber 10 it passes out through a small opening 16 formed at the top of the air chamber. The escaping air draws the liquid coating material 2 through the tube 11 and through the nozzle jet 17 to spray the inner surface 5 of the tube 1. In order to prevent the creation of a vacuum within the container 3 there is provided an air vent 18.

In spraying the screen the complete air and spray gun 4 is oscillated about pivot points 19 so that as the tube 1 turns in the work holder 6, the fluorescent material can be made to cover the entire inner end 5 of the tube.

It is desirable in preparing such a tube screen structure to leave the tube inverted so that if any large particles remain in the prepared material they will fall out through the opening 7 in work holder 6 and not adhere to the end of the tube to cause a non-uniform deposit. The oscillatory motion of the spray gun about the pivot points 19 is at a non-uniform rate so that the time of spraying will be uniform per unit area since, of course, it is most convenient to maintain substantially a constant rate of rotation of the work holder.

After the material is sprayed, the tube is heated to a temperature of approximately 500° C. to drive off the solvent, for example, the amyl acetate, and to oxidize any carbon remaining in the mixture. It is advisable to circulate air or oxygen in the tube during the time the binder is being baked out of the screen material.

During the processing of the tube and during the time when the electrodes are placed therein and when the tube is finally evacuated, it is advisable that excessive heat does not reach the screen material and, therefore, temperatures for evacuation should preferably not exceed a range of between 500° C. and 600° C., for otherwise the sodium compounds may be driven off. It will of course be appreciated that this permissible temperature for evacuation is higher than used in the evacuating process for substantially all commercial tubes. Therefore, it is a relatively easy operation to evacuate the tube to a high degree and this is due to the improved properties of the screen material and the fact that it is unaffected by such heating as is necessary for evacuation.

It is also possible to use the nitrites of other alkali metals contained within the first series of Group I of the periodic series, such as potassium and lithium, although sodium has been illustrated as a preferred example because of its cheapness and availability. In cases where other alkali metals are selected and used, the proportions should be varied in accordance with the molecular weights thereof.

It is also possible to substitute zinc carbonates for the magnesium carbonates, in which case the proportions of the zinc salt used should be in accordance with the molecular weight thereof.

The material above defined has been found to give satisfactory results when used within a cathode ray tube and subjected to the influence of an electron beam appropriately produced and controlled therein and has been found to yield substantially a white light under such conditions. The mixture suggested has been found to be extremely suitable and to retain its fluorescent properties for an indefinite length of time.

While one particular composition of material and appropriate weights thereof has been illustrated by way of example and the suggested composition has proven highly satisfactory, it is, of course, to be understood that this example has been given merely by way of illustration and not in any limiting sense, in that, the proportions of the various ingredients may be varied within wide limits without affecting materially the resulting fluorescent effects or without impairing the qualities of the material or its ease of application to the surface of the inner end wall of the tube.

Having now described the invention, what is claimed is the following:

1. A fluorescent screen material comprising the reaction product resulting from the heating in air of the tungstate of an alkaline earth metal and an alkali nitrite.

2. The material of claim 1, wherein the alkali is sodium.

3. The material of claim 1, wherein the alkali is lithium.

4. The material claimed in claim 1, wherein the alkali is chosen from the first series of Group I.

5. A fluorescent screen material, comprising the reaction product resulting from the heating in air of magnesium tungstate and an alkali nitrite.

6. The material of claim 5, wherein the alkali is sodium.

7. A fluorescent screen material comprising the reaction product resulting from the heating in air of a mixture of 43 parts tungstic acid, corresponding molecular proportions of magnesium carbonate, and 2 parts of lithium nitrite, said heating being continued till all carbon dioxide and nitric oxide fumes cease to evolve.

8. The method of making a fluorescent screen material which comprises mixing sodium nitrite and magnesium tungstate and heating in air till nitric oxide fumes cease.

9. The method of claim 8, wherein a water paste of the mixture is made prior to heating.

10. The method of producing fluorescent screens upon cathode ray tubes which includes the steps of mixing a carbonate of an alkaline earth metal and a nitrite of an alkali metal and heating the mixture and evaporating to dryness, adding a binder material to the dry mixture, spraying the material upon the inner surface of the end wall of the tube, and heating the sprayed end of the tube to oxidize the binder material.

11. A fluorescent screen material comprising the tungstate of a metal selected from the second series of the second group of the periodic system activated by an alkali metal.

12. A fluorescent screen material comprising the tungstate of a metal selected from the second series of the second group of the periodic system activated by sodium.

13. A fluorescent screen material comprising the tungstate of a metal selected from the second series of the second group of the periodic system activated by lithium.

14. The material of claim 1 wherein the metal of the second series of the second group of the periodic system is zinc.

15. The material of claim 1 wherein the metal of the second series of the second group of the periodic system is zinc and the alkali is sodium.

ROSCOE H. GEORGE.